(12) United States Patent
Lemieux

(10) Patent No.: US 6,452,942 B1
(45) Date of Patent: Sep. 17, 2002

(54) SYSTEM AND METHOD FOR PROVIDING WIRELESS LOCAL LOOP ACCESS USING AN ACCESS MULTIPLEXER

(75) Inventor: Yves Lemieux, Kirkland (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/316,409

(22) Filed: May 20, 1999

(51) Int. Cl.[7] .............................................. H04L 12/56

(52) U.S. Cl. .................... 370/468; 370/542; 370/543; 370/408; 709/229; 709/230; 709/104; 709/223

(58) Field of Search ................................ 370/254, 277, 370/280, 310, 310.1, 329, 340, 395.31, 395.52, 395.5, 400, 402, 408, 409, 429, 433, 447; 709/238, 229

(56) References Cited

U.S. PATENT DOCUMENTS 6,094,437 A * 7/2000 Loehndorf et al. ......... 370/420
6,374,303 B1 * 4/2002 Armitage et al. ........... 370/390

OTHER PUBLICATIONS

Loa Andersson, Paul Doolan, Nancy Feldman, Andre Fredette, and Bob Thomas; "LDP Specification"; Jan, 1999; pp. 1–103; Network Working Group Internet Draft.

* cited by examiner

Primary Examiner—Dang Ton
Assistant Examiner—Henry Baron
(74) Attorney, Agent, or Firm—Smith & Danamraj, P.C.

(57) ABSTRACT

A system and method of providing high-speed wireless local loop access using a wireless access multiplexer disposed in an access network coupled to a plurality of network termination (NT) nodes. The access multiplexer is coupled via an aggregate path to a Point of Presence (POP) switch on a common carrier running at a high aggregate bit rate. A Network Management System (NMS) is provided with a database for storing service subscription profiles for subscribers associated with corresponding NT nodes. The subscription profiles include information regarding subscribers' bandwidth requirements and other Quality of Service (QOS) parameters as per their subscriptions. Using the Label Distribution Protocol (LDP) messages and procedures, the access multiplexer establishes a plurality of wireless access channels to the corresponding network termination nodes based on the service subscription profiles stored in the NMS. Each of the wireless access channels is configured as a Label Switched Path and provides a distribution bit rate that is a portion of the aggregate bit rate available on the aggregate path.

18 Claims, 5 Drawing Sheets

SYSTEM AND METHOD FOR PROVIDING WIRELESS LOCAL LOOP ACCESS USING AN ACCESS MULTIPLEXER

BACKGROUND OF THE INVENTION

1. Technical Field of the Invention

The present invention relates to telecommunication systems and, more particularly, to a system and method for providing wireless local loop access to remote site users by way of a digital subscriber line access multiplexer.

2. Description of Related Art

The remote access market is undergoing a major metamorphosis. Three factors serve as catalysts for change. The first is the growing number of users, for example, small office I home office (SOHO) users, demanding high performance Internet and remote access for multimedia. The second factor is the Telecommunications Reform Act, which is fostering broader competition through deregulation. The third and final factor is congestion in the Public Switched Telephone Network (PSTN), originally designed and developed for only voice traffic.

While there have been important advances that enable high rates of throughput in carrier networks' backbone connections, efforts to meet the demand for remote access are beset by the limitations of the existing twisted-pair copper cable infrastructure provided between a carrier's central office (CO) and a subscriber's remote site, typically referred to as the local loop. In the telecommunications art, these limitations are sometimes collectively described as the last-mile problem.

Current advances in technology are making it possible to get more bandwidth from the existing twisted-pair copper cable infrastructure. One of these developments is the Digital Subscriber Line (DSL) technology which utilizes the local loop telephone wiring already installed to virtually every home and business in the world, but does not depend on the rest of the PSTN infrastructure.

DSL is a modem technology for converting existing twisted-pair telephone lines into access paths for multimedia and high-speed data communications. Some versions of this technology are asymmetric with different data rates in the downstream and upstream directions (to and from the subscriber, respectively). Others are symmetric, providing the same data rate both upstream and downstream. Regardless of the version, DSL technology provides three distinct advantages: (i) separation of voice and data communications, (ii) ability to implement the technology incrementally and inexpensively, and (iii) effective utilization of the open market place created by local loop deregulation.

An Asymmetric Digital Subscriber Line (ADSL) circuit connects an ADSL modem on each end of a twisted-pair telephone line, creating three information channels—a high speed downstream channel, a medium speed duplex channel, and depending on the implementation of the ADSL architecture, a Plain Old Telephone Service (POTS) or an Integrated Services Digital Network (ISDN) channel. The POTS/ISDN channel is split off from the digital modem by filters, thus guaranteeing uninterrupted POTS/ISDN connectivity, even if ADSL fails. The high speed channel ranges from 1.5 to 6.1 megabits per second (Mbps) of throughput, while duplex rates range from 16 to 640 kilobits per second (Kbps).

Although the advances described hereinabove provide solutions to some of the problems encountered in current local loop technologies, they suffer from various deficiencies and shortcomings. First, these state-of-the-art solutions involve the use of the existing copper cabling infrastructure, thereby limiting the availability of such solutions only to areas where there is already such cabling. In areas without copper cabling, or with twisted-pair installations having unreliable and unpredictable quality, any advantages offered by the current solutions are quickly diminished. Moreover, installing new twisted-pair wiring in such areas is not only expensive, but also suffers from slow deployment and physical limitations imposed by existing structures. Additionally, there may be regulatory restrictions that need to be complied with, whether or not new cabling is desirable.

Based on the foregoing, it is apparent that in order to address these and other problems of the current technologies set forth above, what is needed is a wireless solution that advantageously offers a high-speed remote access network (or, local loop network) that is capable of delivering broadband content and applications. The present invention provides such a solution.

SUMMARY OF THE INVENTION

In one aspect, the present invention is directed to a resource allocation method for distributing an aggregate bandwidth into a plurality of access channels which form a distribution side of an access network. The network includes an access multiplexer coupled to a Point of Presence (POP) module that is disposed on an aggregate side of the network running at a high bit rate. The distribution side includes a Network Management System (NMS) and a plurality of network termination nodes, each associated with a corresponding user or subscriber. In accordance with the resource allocation method of the present invention, the NMS creates one or more service subscription profiles, wherein each of the service subscription profiles is associated with a corresponding user/subscriber and defines the subscriber's bandwidth requirements and other Quality of Service (QOS) parameters. The service subscription profiles are stored in a database associated with the NMS. An aggregate path between the access multiplexer and the POP module is established for providing the aggregate bandwidth. One or more Label Switched Paths (LSPs) between the POP module and at least a portion of the plurality of the network termination nodes are effectuated via the access multiplexer, wherein each LSP provides an access channel that is substantially based on the service subscription profile corresponding to the network termination node which terminates the LSP.

In a further aspect, the present invention is directed to a system for providing broadband wireless access to a plurality of network termination nodes. The system comprises a POP switch disposed in a high-throughput carrier network and a wireless access multiplexer connected to the POP switch via an aggregate path, the aggregate path providing an aggregate bit rate. An NMS is coupled to the wireless access multiplexer which includes a database for storing a plurality of service subscription profiles associated with corresponding subscribers. In the database, each subscriber is identified with a particular network termination node. The access multiplexer establishes a plurality of wireless access channels to the corresponding network termination nodes based on the service subscription profiles stored in the NMS. Each of the wireless access channels provides a distribution bit rate that is a portion of the aggregate bit rate available on the aggregate path.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
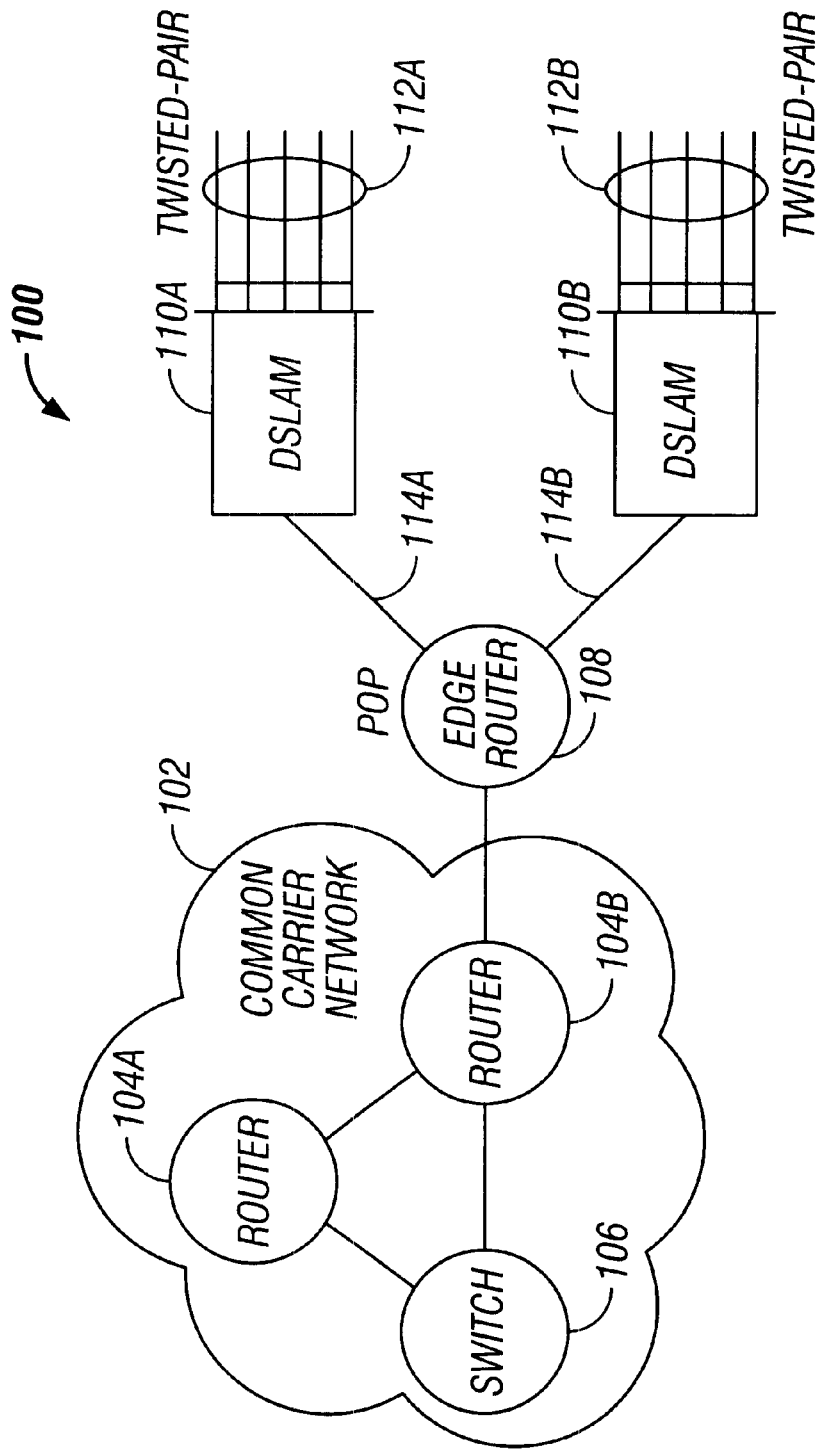
FIG. 1 (Prior Art) depicts a functional block diagram of a conventional access network arrangement for bandwidth distribution on twisted-pair lines using DSL.

In the drawings, like or similar elements are designated with identical reference numerals throughout the several views, and the various elements depicted are not necessarily drawn to scale. Referring now to FIG. 1, depicted therein is a functional block diagram of a conventional access network arrangement 100 for distributing bandwidth on twisted-pair lines using DSL. A high-speed common carrier network 102, for example, an Asynchronous Transfer Mode (ATM) network, is exemplified by a plurality of routers, for example, router 104A and router 104B, interconnected with one or more switches, for example, switch 106. An edge router 108 is provided as a Point-Of-Presence (POP) node that feeds one or more Digital Subscriber Line Access Multiplexer (DSLAM) modules, for example, DSLAM 110A and DSLAM 110B, via high-speed links, link 114A and link 114B, respectively.

Each DSLAM module multiplexes the available data transmission rate or bandwidth on its high-speed link (for example, links 114A and 114B, designated hereinafter as the aggregate paths) into a plurality of DSL subscriber lines, for example, lines 112A, that run at lower transmission rates on the existing twisted-pair copper.

Figure 2:
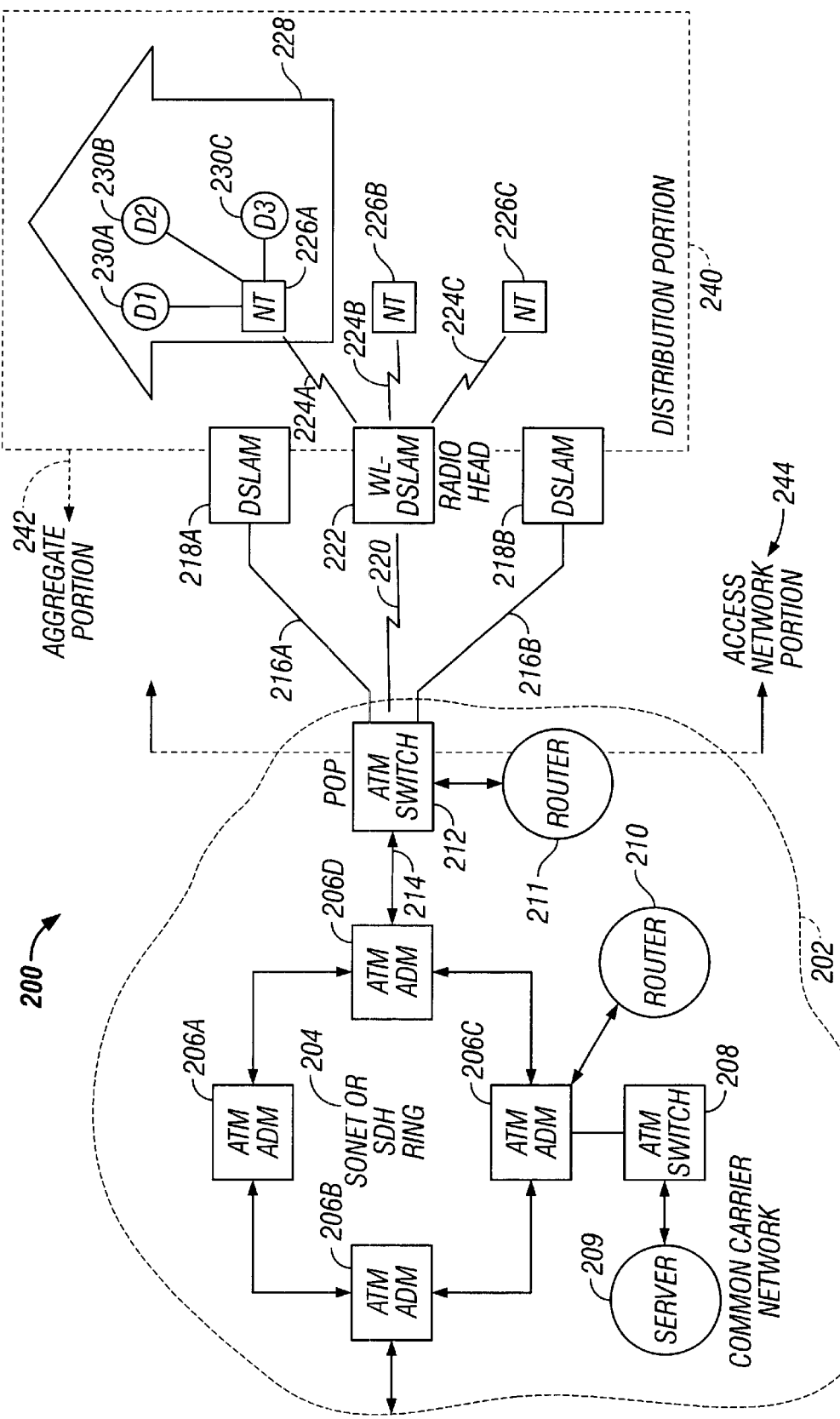
FIG. 2 depicts a functional block diagram of an exemplary embodiment of a wireless local loop arrangement using a wireless Digital Subscriber Line Access Multiplexer module provided in accordance with the teachings of the present invention.

FIG. 2 depicts a functional block diagram of an exemplary embodiment of a wireless local loop arrangement 200 using a wireless DSLAM (WL-DSLAM or a "radio head") module 222 in accordance with the teachings of the present invention. A high-speed common carrier network 202 is preferably provided as a Synchronous Optical Network (SONET) or related Synchronous Digital Hierarchy (SDH) ring 204 formed from a plurality of ATM Add/Drop Multiplexers (ADM), for example, ADM 206A–206D. Other network elements, such as a server 209, routers 210 and 211, and ATM switches 208 and 212 are interconnected within the SONET ring 204. The ATM switch 212 is disposed within the common carrier network 202 as a POP node for providing access to and from an access network portion 244. The POP ATM switch 212 is preferably connected to a SONET ATM/ADM module, for example, ATM/ADM 206D, via a high-speed link 214 capable of throughput in the order of several megabits per second. Preferably, the high-speed link 214 is implemented to transport an Optical Carrier 12 (OC-12) optical signal operating at around 622.080 Mbps.

Continuing to refer to FIG. 2, the POP ATM switch 212 is connected to a plurality of DSLAM modules by way of high-speed channels, preferably capable of transporting an Optical Carrier 3 (OC-3) optical signal operating at around 155.52 Mbps. For example, DSLAM 218A and DSLAM 218B are connected by way of paths 216A and 216B, respectively, to the POP ATM switch 212. It should be apparent that each of these DSLAM modules may be interconnected to a plurality of wireline nodes by way of the conventional arrangement described hereinabove.

Further, in accordance with the teachings of the present invention, a high-speed wireless link (aggregate path) 220 is provided between the POP ATM switch 212 and the WL-DSLAM module 222. Preferably, the aggregate throughput via the wireless link is provided to be around 37.5 Mbps. The WL-DSLAM 222 multiplexes this aggregate throughput into a plurality of wireless distribution channels, for example, channels 224A–224C. Preferably, these channels are capable of operating between at around 384 Kbps and at around 2 Mbps. At these operating rates, the WL-DSLAM 222 can concentrate about 97 and 18 channels, respectively, into one single wireless aggregate path link 220.

Each of the distribution channels is terminated with a network termination (NT) node or module that is provided at a user's (or subscriber's) home, office, business, or any other facility. For example, three NT modules 226A–226C are shown in this FIG. Also, for purposes of illustration, the NT module 226A is provided at a subscriber's facility 228 which includes three devices, D1 (reference numeral 230A), D2 (reference numeral 230B), and D3 (reference numeral 230C), each requiring a portion of the bandwidth provided by the distribution channel 224A.

It should be readily appreciated that the wireless local loop (WLL) distribution channels provided in accordance herewith advantageously utilize the DSL modem technology to support transmission operating rates that are capable of delivering a host of broadband applications such as multimedia, videoteleconferencing, video-on-demand, games-on-demand, et cetera. Preferably, a suitable Time Division Multiple Access (TDMA) scheme may be utilized for the air interface required for implementing the WLL distribution channels. Further, the air interface may be provided in accordance with standard protocols such as ANSI-136 or GSM, using a common carrier signal, for example, a 200 KHz (for a 384 Kbps data rate) or 1.6 MHz (for data rates up to 2 Mbps) signal.

Figure 3:
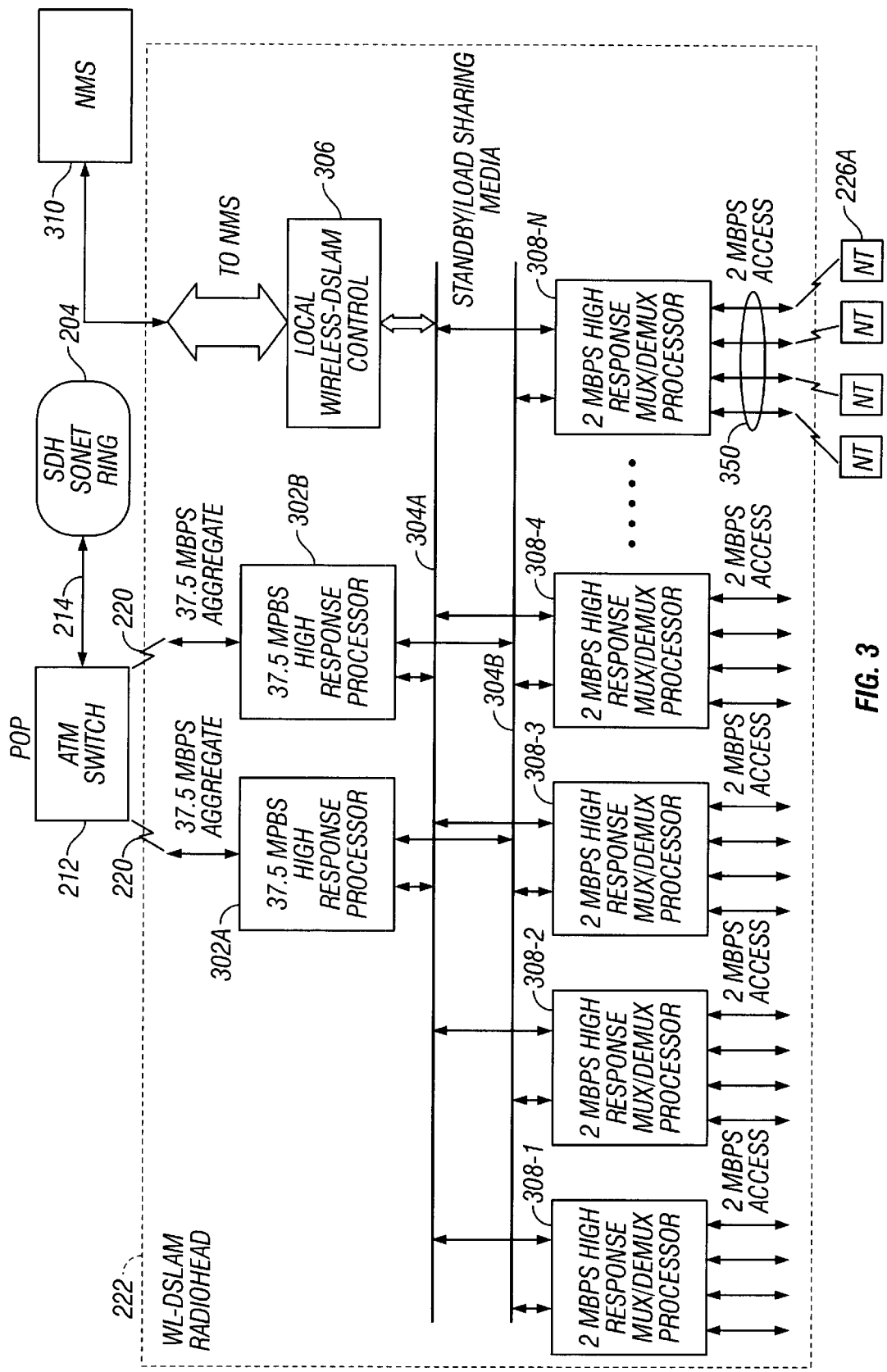
FIG. 3 depicts a functional block diagram of a wireless DSLAM module in accordance with the teachings of the present invention.

Referring now to FIG. 3, depicted therein is a functional block diagram of a wireless DSLAM module, for example, the WL-DSLAM module 222, provided in accordance with the teachings of the present invention. The SONET-SDH ring 204 and the POP ATM switch 212 have been described hereinabove in reference to FIG. 2. The WL-DSLAM module 222 preferably comprises two broadband communication media, 304A and 304B, for redundancy, each of which is connected to two high response, high-speed processors (reference numerals 302A and 302B) on the aggregate path side. The high-speed processors 302A and 302B ("aggregate processors") are provided with the capability to interface with the POP ATM switch 212 via the high-speed wireless aggregate path link 220.

A plurality of multiplexer/de-multiplexer (MUX/DEMUX) processors, for example, 308-1 through 308-N ("distribution processors"), are connected to each of the redundant communication media 304A and 304B on the distribution side for providing multiple high-speed distribution channels. For example, the MUX/DEMUX processor 308-N provides up to four 2 Mbps access channels 350 in accordance with the teachings of the present invention, each of which is radio-linked via the WLL to a network termination module, such as the NT 226A.

A control block 306 is provided for controlling the overall functionality of the WL-DSLAM module 222. The control block 306 is interfaced with a Network Management System 310 in order to coordinate resource allocation in accordance herewith. It should be appreciated that in the context of the present invention resource allocation includes, for example, dividing the higher aggregate throughput available from the POP ATM switch 212 among the plurality of distribution channels 350. Preferably, the resource allocation is performed on the basis of the subscriber's subscription profile which may be provided as part of the NMS 310.

In accordance with the teachings of the present invention, the NMS 310 may preferably be provided as either a centralized or distributed Home Location Register (HLR) or some other suitable subscriber service database system separate from the HLR. The service subscription profiles are used for storing the subscribers' throughput requirements and other Quality of Service (QOS) parameters in accordance with their need or other criteria. Based on these profiles, the aggregate resource is allocated among the WLL distribution channels by the NMS 310.

The NMS 310 is preferably provided with the following functionality: (i) creation of subscriber service profiles; (ii) management of profile database; (iii) resource allocation control; and (iv) resource supervision. Resource allocation is performed preferably by using a Multi Protocol Label Switching (MPLS) scheme such as, for example, the Label Distribution Protocol (LDP) that is suitably modified in accordance herewith.

The Label Distribution Protocol is a still-evolving, work-in-progress traffic routing procedure being defined under the supervision of the Internet Engineering Task Force (IETF). The current version of the specification defining the LDP is available as an Internet-Draft at <http://search.ietf.org/internet-drafts/draft-ietf-mpls-ldp-03.txt> (Rev. 03, dated January 1999 and having an expiration date of July 1999) and is incorporated by reference herein. Since the innovative teachings of the present invention are exemplified in terms of the LDP procedures and messages, a brief overview thereof is provided immediately hereinbelow.

The LDP is a set of procedures and messages by which entities designated as Label Switched Routers (LSRs) establish connection paths called Label Switched Paths (LSPs) through a network. This is accomplished by mapping network-layer routing information directly to data-link layer switched paths. The mapping is effectuated by using labels which are employed for creating a packet forwarding paradigm. An essential element in the LDP procedures is that by assigning a label to information packets, a transmitting device is rendered capable of forwarding all packets with the same label in the same way. If the packet is to be forwarded solely by looking at the label, then at a minimum, all packets with the same incoming label must be forwarded to the same port or ports with the same encapsulations, and with the same next hop label, if necessary. It should be readily appreciated that the connection paths established, accordingly, are called LSPs and the transmission process is termed "Label Switching."

The LDP associates a Forwarding Equivalence Class (FEC) with each LSP it creates. The FEC associated with an LSP specifies which packets are "mapped" to that LSP. It can be seen that essential to label switching is the notion of binding between a label and network-layer routing (that is, routes). A control component is responsible for creating label bindings and distributing the label binding information among label switches. Label assignment, accordingly, involves allocating a label and binding a label to a route.

The LDP uses a Type-Length-Value (TLV) encoding scheme to encode the information carried in LDP messages, which are exchanged sending LDP protocol data units (PDUs) over LDP-session Transmission Control Protocol (TCP) connections. There are four categories of LDP messages currently: (i) Discovery messages, used to announce and maintain the presence of an LSR in a network; (ii) Session messages, used to establish, maintain, and terminate sessions between LDP peers; (iii) Advertisement messages, used to create, change, and delete label mapping for FECs; and (iv) Notification messages, used to provide advisory information and to signal error information.

Approximately 10 message types are currently defined for effectuating the LDP procedures. The following types are particularly notable:

(i) Hello message:
   The LDP Hello messages are exchanged as part of the LDP Discovery mechanism by which an LSR discovers potential LDP peers.

(ii) Initialization message:
   The Initialization message is exchanged as part of the LDP session establishment procedure. Typically, the exchange of LDP Discovery Hellos between two LSRs triggers establishment of an LDP session. In general, the LDP session establishment is provided as a two-step process involving: (a) transport connection establishment and (b) session initialization.

(iii) KeepAlive message:
   An LSR sends KeepAlive messages as part of a mechanism that monitors the integrity of an LDP session transport connection.

(iv) Address message:
   An LSR sends the Address message to an LDP peer to advertise its interface addresses. An LSR that receives an Address message uses the addresses it learns in order to maintain a database for mapping between peer LDP Identifiers and next hop addresses.

(v) Address Withdraw message:
   An LSR sends the Address Withdraw message to an LDP peer to withdraw previously advertised interface addresses.

In accordance with the teachings of the present invention, two additional messages are provided as part of what may be referred to as "Extended LDP" for the purpose of resource allocation by way of muxing and demuxing the resources between the aggregate-side nodes and the distribution-side nodes within the access network portion 244 described in reference to FIG. 2 set forth hereinabove. These messages are presently labeled as the "setup-to_N" and "teardown-from_M" messages, the use of which will be described in greater detail hereinbelow.

Figure 4:
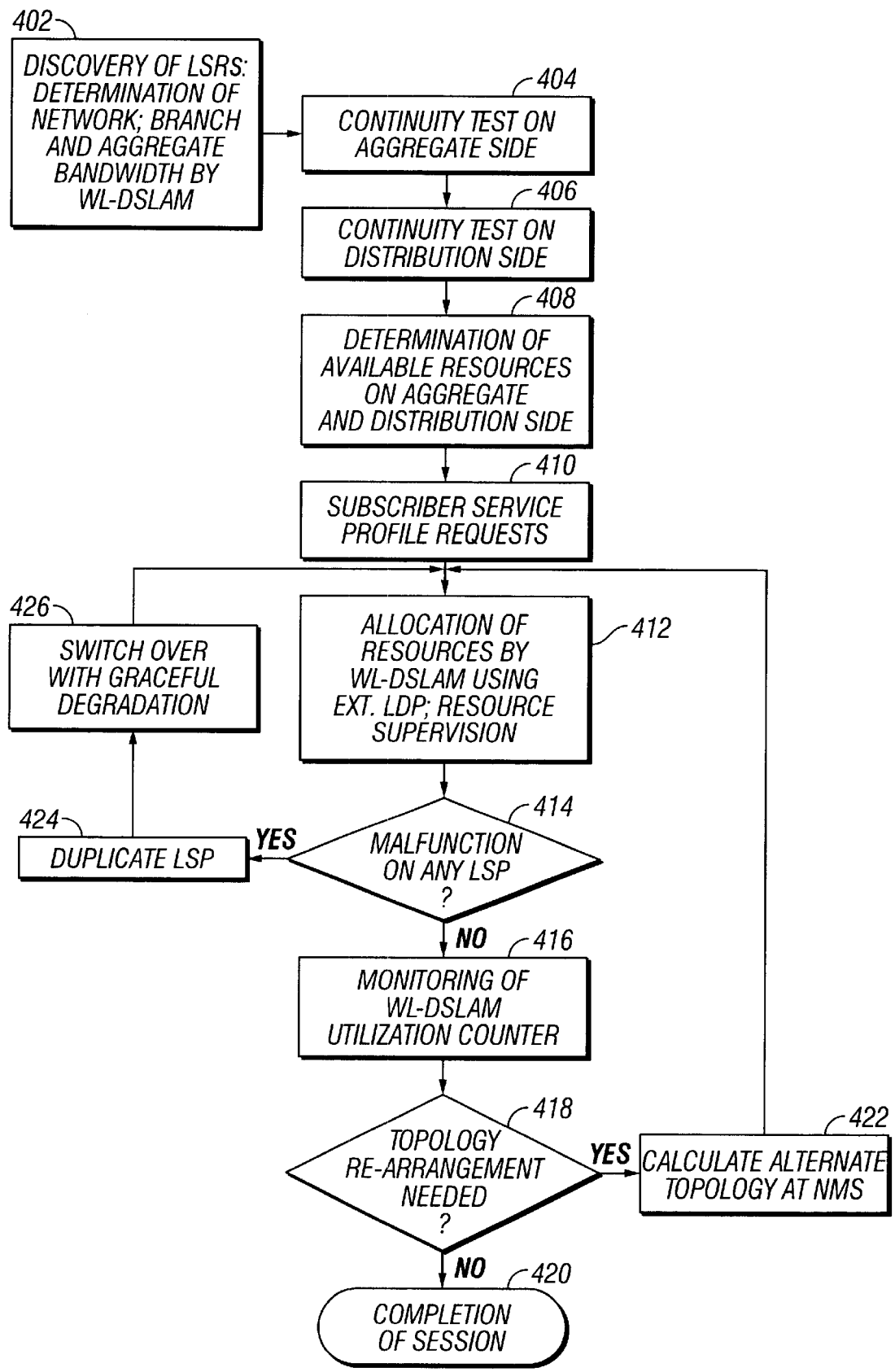
FIGS. 4A and 4B depict a flow diagram of a resource allocation method for distributing aggregate bandwidth in accordance with the teachings of the present invention.

Referring now to FIGS. 4A and 4B, a flow diagram is depicted therein for illustrating a presently preferred exemplary embodiment of the resource allocation method in accordance with the teachings of the present invention. It should be appreciated by those of ordinary skill in the art upon reference hereto that the network terminations, the WL-DSLAM module, NMS database and the POP module, all of which have been described hereinabove, may be characterized as LDP peers or nodes in accordance herewith. As provided in step 402, the WL-DSLAM module determines from the NMS that it is part of a particular access network portion, and on a specific branch having a particular aggregate bandwidth. Preferably, this determination is performed in conjunction with the initial discovery ofLSRs in accordance with the LDP Discovery mechanism. The WL-DSLAM then executes a continuity test with its aggregate side as well as the distribution side (steps 404 and 406, respectively) by sending test patterns on a dedicated test virtual circuit (VC).

A determination is made by the WL-DSLAM with respect to the available resources on both the aggregate side and the distribution side (step 408). The resource types typically include bandwidth availability and/or requirements, and QOS parameters such as end-to-end packet delay, jitter, loss, and throughput utilization. The WL-DSLAM requests the NMS for subscribers' service profiles, each of which is associated with a network termination node in the WLL of the access network portion (step 410).

Continuing to refer to FIGS. 4A and 4B, the available resources as determined in step 408 are then allocated by using the Extended LDP procedures and messages propagated among the concerned nodes (step 412), now connected in appropriate LSPs. Further, as shown in step 412, resource supervision by the NMS is maintained preferably as a background process, in conjunction with appropriate LDP control.

If a malfunction condition is found on any LSP (decision block 414), that particular LSP is preferably duplicated (step 424) by using the redundancy in the same WL-DSLAM or by using one or more separate WL-DSLAM modules all together. Additional topological combinations may also be utilized for determining duplicate paths. Once a duplicate LSP is established, a switch over is effectuated with graceful degradation. In other words, the malfunctioning session continues to be maintained while the duplicate LSP is established and substituted for the malfunctioning LSP (step 426). Thereafter, resources are allocated using the newly-configured LSP paths, as per step 412 set forth above. On the other hand, if there was no malfunctioning of any LSPs, the resource allocation method of the present invention proceeds to monitor a resource utilization counter preferably associated with the WL-DSLAM (step 416) in order to verify that the throughput on the distribution side is at least in substantial accordance with the users' service subscription profiles and other related performance criteria. Based on the monitoring of the utilization counter, a determination is made (decision block 418) to verify if the connection paths among the POP, WL-DSLAM and the network termination nodes need to topologically re-arranged. If so, an alternate topology is calculated at the NMS where the resource allocation and supervision are once again determined, as provided in step 412. If no topological re-arrangement is needed, the resource allocation sessions on the established LSPs are maintained until completion (step 420).

Figure 5:
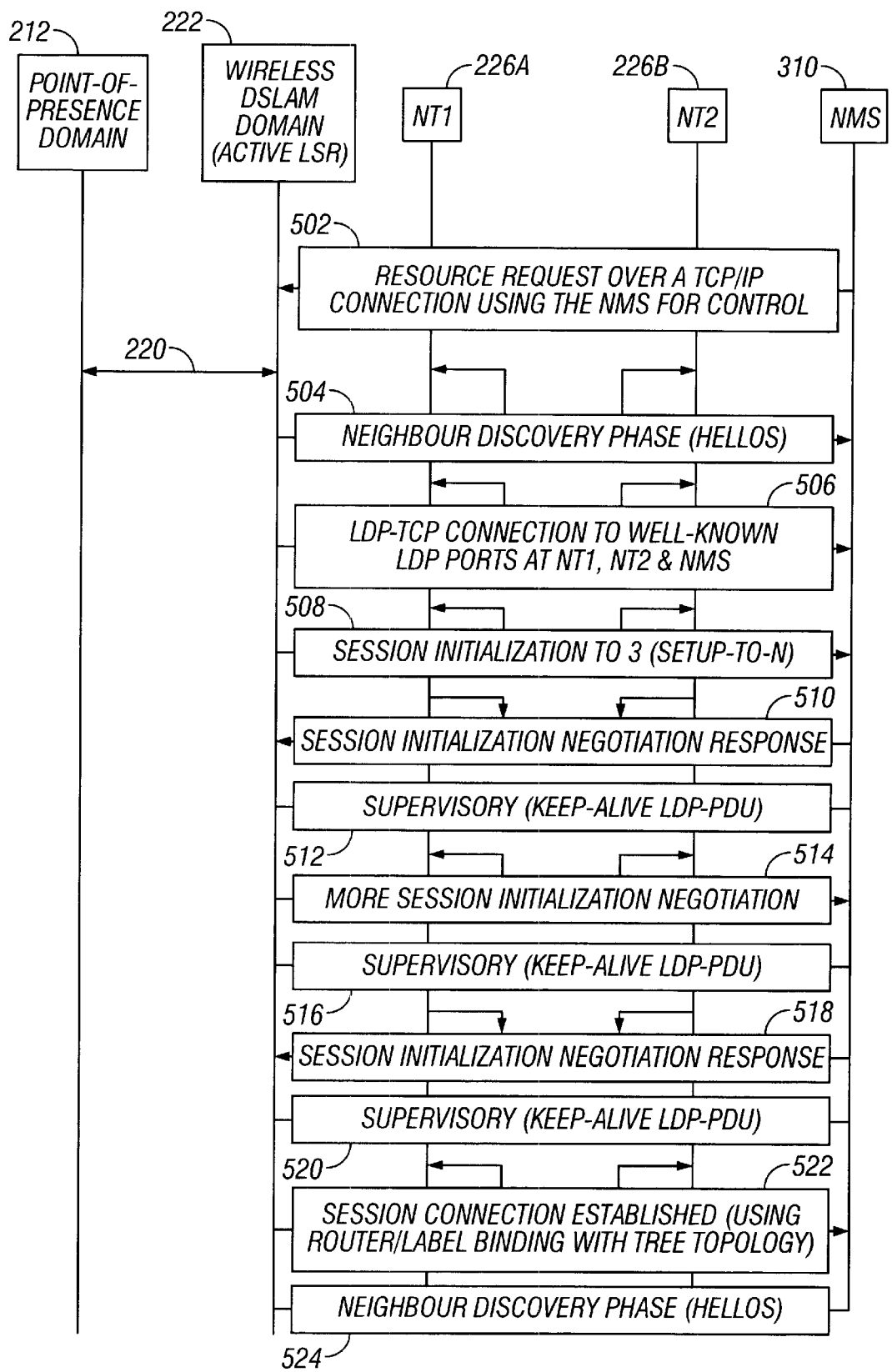
FIG. 5 is a control message pathway for implementing a presently preferred exemplary embodiment of the resource allocation method using the Extended Label Distribution Protocol provided in accordance with the teachings of the present invention.

Referring now to FIG. 5, shown therein is a control message pathway for setting up a "tree allocation scenario" wherein the aggregate bandwidth (for example, the 37.5 Mbps stream described in FIG. 2) is divided into various distribution or WLL access channels in accordance with the presently preferred exemplary embodiment of the present invention set forth above. The call set-up process for resource allocation preferably starts from the WL-DSLAM 222 with a Neighbor Discovery phase performed on the entire WL-DSLAM domain (that is, including all peers/nodes in its access network portion), with the WL-DSLAM being the active LSR. Preferably, an inter-domain connection such as, for example, the high-speed aggregate side link 220, should already be up and running as a normal virtual circuit connection between the POP 212 and the WL-DSLAM 222.

The NMS 310, through operator provisioning, sends a "Resource Request" message 502 over a TCP/IP connection to the WL-DSLAM 222. Preferably, an ATM channel may be used for supporting the call. Upon receipt of the Resource Request message 502, the WL-DSLAM 222 initiates the set-up procedure. An LDP Neighbor Discovery phase 504 is accomplished, preferably automatically and in the background, through the use of a dedicated signaling channel. One or more Hello messages are sent for this purpose to all nodes of the WL-DSLAM domain. The NMS 310 and the NT nodes 226A and 226B are exemplified herein.

Once the nodes are identified, the WL-DSLAM 222 establishes LDP-TCP connection 506 to the LDP ports at NT1 226A, NT2 226B and NMS 310 for the proper transport of LDP control and signaling messages. After the control and signaling transport has been done, sessions are then initialized with respect to the discovered nodes (for example, the three nodes here) by invoking the setup-to_N message (508), so that one aggregate LSP is branched to the nodal end-points, that is, the NT1 226A, NT2 226B and NMS 310. These nodes, subsequently, return one or more "Session Initialization Negotiation Response" messages (510) as appropriate.

Continuing to refer to FIG. 5, one or more supervisory KeepAlive LDP-PDUs are monitored in the background to ensure the viability of the session connections (step 512). Additionally, more "Session Initialization Negotiation" messages are sent from the WL-DSLAM 222 to the nodes (514). Also, additional supervisory KeepAlive LDP-PDUs are monitored (516). Additional response messages and supervision may continue as per the LDP procedures. These flow paths are labeled with reference numerals 518 and 520.

After these negotiation messages and responses, with the background supervision for session viability, the LSPs for users (denoted by the NT 1 and NT2 nodal end-points) are fully established through the access network using the Route/Label binding with a tree topology (522). The content transport may continue once the user LSPs are established, in accordance with the distribution channel parameters thus negotiated. Furthermore, automatic Neighbor Discovery phase 524 is maintained in the background through the use of dedicated signaling channels in order to accommodate additional nodes that may be added later on. Hello messages are broadcast again for that purpose to the nodes of the WL-DSLAM domain. Once a session is completed and no longer needed, the established LSP may be deactivated by using a teardown-from_M process which disengages the appropriate node from sharing in the aggregate throughput.

Based upon the foregoing, it should now be apparent to those of ordinary skill in the art that the present invention is directed to a solution which advantageously provides high-speed access channels via a Wireless Local Loop using a DSL access multiplexer without the deficiencies and shortcomings of the existing solutions described in the Background section of the present patent application. By using wireless access channels, the present invention offers the advantage of fast deployment, with no physical limitations encountered in conventional cabling and local-loop technologies. Although the system and method of the present invention have been described in particular reference to the still-evolving LDP, it should be realized upon reference hereto that the innovative teachings contained herein are not necessarily limited thereto and may be implemented advantageously with any applicable MPLS.

Further, it is believed that the operation and construction of the present invention will be apparent from the foregoing description. While the method and system shown and described have been characterized as being preferred, it will be readily apparent that various changes and modifications could be made therein without departing from the scope of the present invention. For example, although a SONET-SDH ring topology has been described as an exemplary carrier network arrangement, it should be understood that other network implementations may also be used wherein the teachings of the present invention may be advantageously employed.

Moreover, as an additional feature, redundant WL-DSLAM modules may be provided within a branch from a POP switch module of the common carrier network. Further, multiple WL-DSLAM modules may be disposed between the POP module and the NT devices at the users' SOHO facility. Although the access multiplexer of the present invention has been exemplified with the use of ADSL, different versions of DSL and other types of broadband remote access technologies may also be used within the context of the present invention.

Accordingly, based on the foregoing, it should be readily appreciated by those skilled in the art that all such modifications, enhancements, additions, rearrangements, et cetera, are deemed to be within the scope of the present invention which is defined solely by the following claims.

What is claimed is:

1. A resource allocation method for distributing an aggregate bandwidth into a plurality of access channels forming a distribution side of a network, the network including an access multiplexer coupled to a Point-of-Presence (PoP) module disposed on an aggregate side of the network, wherein the distribution side includes a network management system (NMS) and a plurality of network termination nodes, the method comprising the steps of:

creating one or more service subscription profiles by the NMS, wherein each of the service subscription profiles is associated with a corresponding subscriber and defines the subscriber's bandwidth requirements and quality of service (QOS) parameters to which the subscriber has a service subscription;

storing, in a database associated with the NMS, the service subscription profiles for the subscribers, wherein each network termination node corresponds to a particular subscriber;

establishing an aggregate path between the access multiplexer and the POP for providing the aggregate bandwidth;

effectuating, via the access multiplexer, one or more label switched paths (LSPs) between the POP module and at least a portion of the plurality of the network termination nodes, wherein each LSP provides an access channel that is substantially based on the service subscription profile corresponding to the network termination node which terminates the LSP.

2. The method as set forth in claim 1, wherein the effectuating step further comprises the steps of:

determining, by the access multiplexer, a network portion of the network and a branch portion of the network portion to which the access multiplexer belongs;

determining, by the access multiplexer, the aggregate bandwidth of the aggregate path;

discovering, by the access multiplexer, the nodes on the network that belong to the access multiplexer's domain;

negotiating one or more viable sessions between the access multiplexer and the discovered nodes to which access channels are extended;

executing a continuity test by the access multiplexer, by sending a selected test pattern on a dedicated virtual circuit defined over the aggregate side and the distribution side;

determining, by the access multiplexer, resources available on the aggregate side and on the distribution side, based on a request to the database associated with the NMS for the service subscription profiles; and allocating the available resources to the access channels established between the access multiplexer and the discovered nodes.

3. The method as set forth in claim 2, further comprising the steps of:

determining, by the NMS, whether there is a malfunction condition on an access channel established via the LSP associated therewith; and if so, duplicating the associated LSP and switching over the service session thereon to the duplicated LSP.

4. The method as set forth in claim 1, wherein each of the access channels on the distribution side comprises a wireless local loop.

5. The method as set forth in claim 4, wherein the wireless local loop is implemented via a digital subscriber line (DSL) connection between the access multiplexer and the node terminating the wireless local loop.

6. The method as set forth in claim 4, wherein the wireless local loop is implemented via an asymmetric digital subscriber line (ADSL) connection between the access multiplexer and the node terminating the wireless local loop.

7. The method as set forth in claim 4, wherein the wireless local loop is implemented on a 200 KHz carrier wave.

8. The method as set forth in claim 4, wherein the wireless local loop is implemented on a 1.6 MHz carrier wave.

9. A system for providing broadband wireless access to a plurality of network termination nodes, comprising:

a point of presence (POP) switch disposed in a high-throughput carrier network;

a wireless access multiplexer connected to the POP switch via an aggregate path, the aggregate path providing an aggregate bit rate; and a network management system (NMS) coupled to the wireless access multiplexer, the NMS having a database for storing a plurality of service subscription profiles associated with corresponding subscribers, each subscriber being identified with a particular network termination node, wherein the wireless access multiplexer establishes a plurality of wireless access channels to the corresponding network termination nodes based on the service subscription profiles stored in the NMS, each of the wireless access channels having a distribution bit rate that is a portion of the aggregate bit rate provided on the aggregate path.

10. The system set forth in claim 9, wherein the high-throughput carrier network comprises a synchronous optical network (SONET) in a ring topology and the POP switch comprises an Asynchronous Transfer Mode (ATM) switch disposed thereon.

11. The system set forth in claim 9, wherein the access multiplexer further comprises:

two aggregate processors, each operating at the aggregate bit rate and interfaced to the POP switch;

a plurality of distribution processors, each operating at the distribution bit rate and providing a sub-plurality of the plurality of wireless access channels;

two broadband communication paths disposed between the two aggregate processors and the plurality of distribution processors such that each of the aggregate processors and each of the distribution processors are connected to both of the two broadband communication paths; and a local control block interfaced to the NMS, for controlling bit stream multiplexing operations between the aggregate bit rate and the distribution bit rate.

12. The system set forth in claim 11, wherein the aggregate bit rate is substantially around 37.5 Mbps.

13. The system set forth in claim 11, wherein the distribution bit rate is substantially around 384 Kbps.

14. The system as set forth in claim 11, wherein the distribution bit rate is substantially around 2 Mbps.

15. The system as set forth in claim 9, wherein the plurality of wireless access channels are implemented using a 200 KHz carrier wave.

16. The system as set forth in claim 9, wherein the plurality of wireless access channels are implemented using a 1.6 MHz carrier wave.

17. The system as set forth in claim 9, wherein the plurality of wireless access channels are implemented using a Digital Subscriber Line (DSL) local loop.

18. The system as set forth in claim 9, wherein the plurality of wireless access channels are implemented using an Asynchronous Digital Subscriber Line (ADSL) local loop.

* * * * *